(12) United States Patent
Teach

(10) Patent No.: US 9,850,930 B2
(45) Date of Patent: Dec. 26, 2017

(54) SHAFT ADAPTER

(71) Applicant: Paratech, Incorporated, Frankfort, IL (US)

(72) Inventor: William O. Teach, Frankfort, IL (US)

(73) Assignee: Paratech, Incorporated, Frankfort, IL (US)

(*) Notice: Subject to any disclaimer, the term of this patent is extended or adjusted under 35 U.S.C. 154(b) by 434 days.

(21) Appl. No.: 14/687,235

(22) Filed: Apr. 15, 2015

(65) Prior Publication Data

US 2015/0308474 A1    Oct. 29, 2015

Related U.S. Application Data

(60) Provisional application No. 61/983,505, filed on Apr. 24, 2014.

(51) Int. Cl.
*F16B 7/04* (2006.01)

(52) U.S. Cl.
CPC .................................. *F16B 7/042* (2013.01)

(58) Field of Classification Search
CPC ........... F16B 7/02; F16B 7/042; F16B 7/0433
USPC .................................. 403/391, 396, 109.3
See application file for complete search history.

(56) References Cited

U.S. PATENT DOCUMENTS

| | | | | |
|---|---|---|---|---|
| 3,219,373 A * | 11/1965 | Sutliff | ................... | E21B 17/046 285/18 |
| 3,672,710 A * | 6/1972 | Kroopp | ................. | E04B 1/5831 403/201 |
| 4,270,367 A * | 6/1981 | Santore | ..................... | F16D 3/06 403/109.3 |
| 4,767,230 A * | 8/1988 | Leas, Jr. | ............... | B25B 27/023 403/16 |
| 5,501,542 A * | 3/1996 | Hall, Sr. | ................. | F16D 1/101 209/369 |
| 8,485,751 B2 * | 7/2013 | Vetesnik | ................. | F16B 7/105 403/109.1 |
| 2014/0140759 A1 * | 5/2014 | Bodtker | ............... | F16D 1/0894 403/322.2 |
| 2015/0110545 A1 * | 4/2015 | Carnevali | ............... | F16D 1/116 403/164 |
| 2015/0308474 A1 * | 10/2015 | Teach | ..................... | F16B 7/042 403/360 |
| 2016/0333939 A1 * | 11/2016 | Dupere | ................. | E21B 17/046 |

FOREIGN PATENT DOCUMENTS

| | | | | |
|---|---|---|---|---|
| DE | 858924 C | * | 12/1952 | ............ B23B 31/06 |
| EP | 2105618 A2 | * | 9/2009 | ............ F16B 7/042 |
| NL | EP 2982808 A1 | * | 2/2016 | ............ E04G 11/50 |

* cited by examiner

*Primary Examiner* — Benjamin Fiorello
(74) *Attorney, Agent, or Firm* — Banner & Witcoff, Ltd.

(57) ABSTRACT

A shaft adapter configured to be removably-coupled to shafts of differing diameters. The shaft adapter may have a stepped cylinder cavity with multiple inner diameters. The shaft adapter may further have a spring-loaded adapter ring configured to translate along an inner wall of the stepped cylinder cavity, and may be configured to support an outer wall of a first shaft received into the shaft adapter, or may be configured to be urged into a compressed position when the shaft adapter receives a second shaft.

20 Claims, 8 Drawing Sheets

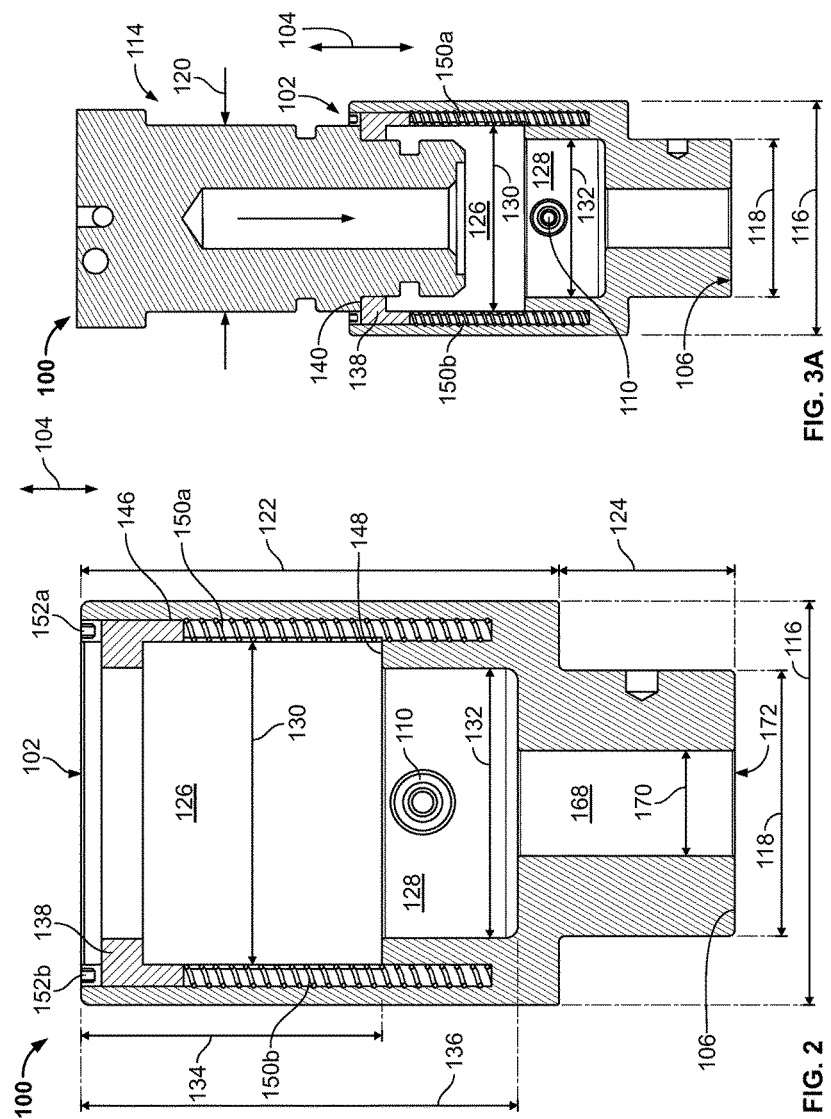

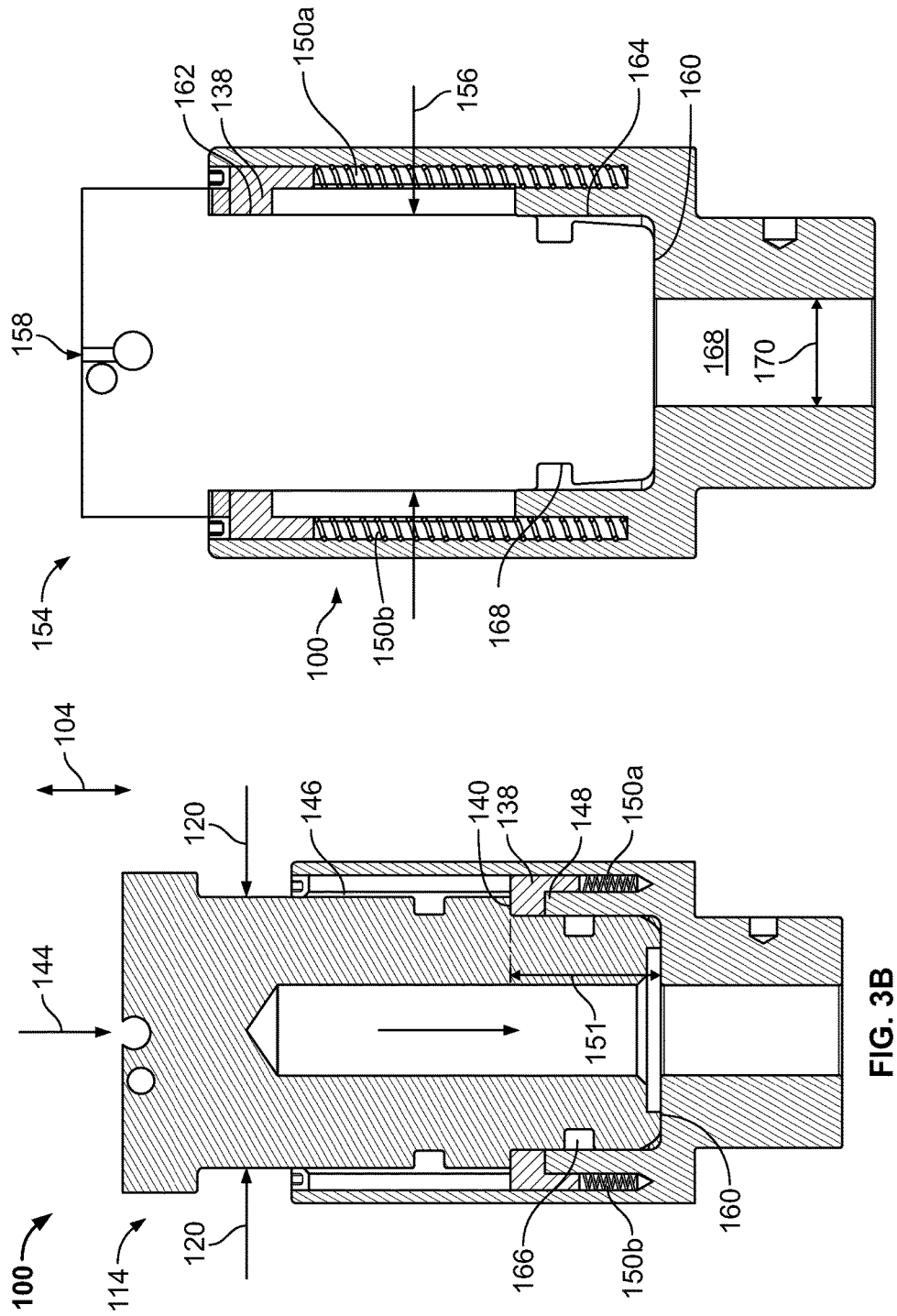

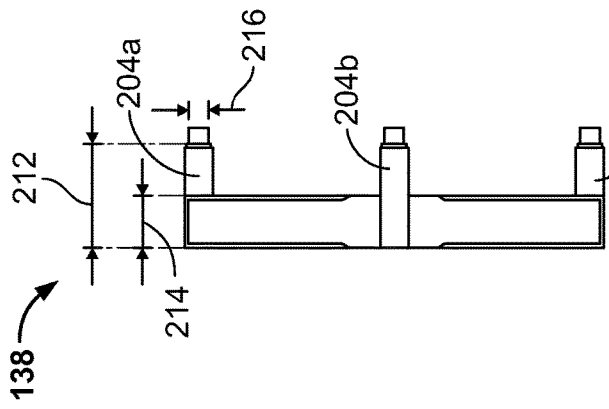
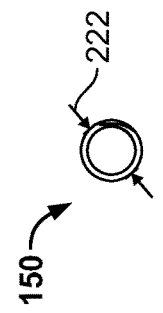
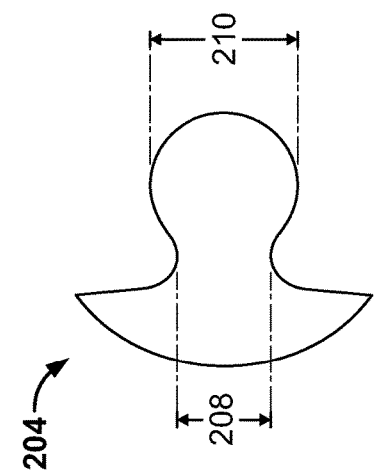
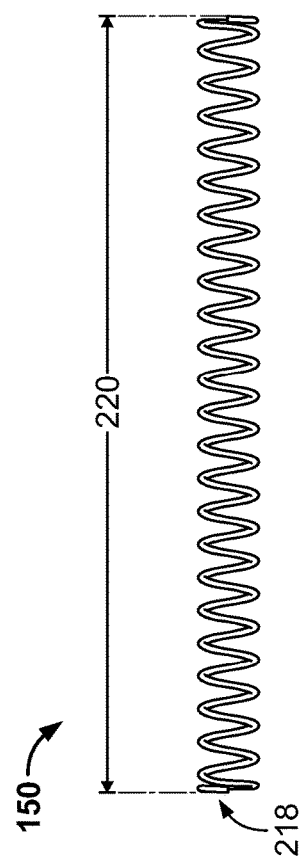

SHAFT ADAPTER

CROSS REFERENCE TO RELATED APPLICATIONS

The present application is a non-provisional of U.S. Provisional Application No. 61/983,505, entitled "RESCUE AND SAFETY SUPPORT STRUT DUAL SHAFT END ADAPTER," filed on Apr. 24, 2014, the content of which is hereby incorporated by reference in its entirety for all purposes.

BACKGROUND

A strut may be utilized to brace an unstable structure. For example, one or more struts may be positioned to brace one or more unstable structures of a vehicle following an accident. In another example, one or more struts may be positioned to reinforce one or more damaged structures within a ship, such as bulkheads, sections of a hull, or one or more hatches. In yet another example, one or more struts may be positioned to bear part, or all, of a weight of one or more of a wall, a ceiling, or a roof of an unstable structure. Accordingly, an strut may be utilized by emergency services, or other users, in time-sensitive situations and/or situations where the types of on hand materials are limited, where there is a possibility of/there has been structural failure of one or more load-bearing elements.

In one implementation, a strut may be utilized within a stabilizing or shoring system. Accordingly, a system may comprise a plurality of struts, extensions, and connection elements or devices. As such, a strut may be configured to interface with, or connect to, one or more compatible devices, including, among others, an anchor point, a shoring base including one or more surfaces configured to abut an external surface or structure, a base plate, a ram device (e.g. a hydraulic ram device), and/or one or more extensions. In one example, a strut may comprise a shaft embodied with a substantially cylindrical shape. Further, shafts of different diameters may be utilized within a strut/shoring system. As such, certain connection elements may be configured to connect to a shaft of a specific diameter, and may be incompatible with shafts of different diameters.

Accordingly, a need exists for a shaft adapter device, configured to be removably coupled to shafts of differing diameters.

BRIEF SUMMARY

One or more of the above-mentioned needs in the art are satisfied by aspects described herein. According to one aspect, a shaft adapter may have a stepped cylinder structure with a first outer diameter stepping down to a second outer diameter. The shaft adapter may have a first bore centered at a first end, and extending to a first depth. The shaft adapter may further have a second bore, with a diameter less than the first bore, and extending to a second depth, greater than the first depth. The shaft adapter may have a spring-loaded adapter ring configured to move along an inner wall of the first bore between the first end of the shaft adapter, and a step surface between the first bore and the second bore. The shaft adapter may receive a first shaft comprising a first shaft diameter approximately equal to a diameter of the first bore, or a second shaft comprising a second shaft diameter approximately equal to a diameter of the second bore. Upon receiving the first shaft, the spring-loaded adapter ring may be urged towards the step surface, and an outer wall of the first shaft may be supported against an inner wall of the first bore. Upon receiving the second shaft, the spring-loaded adapter ring may be held at the first end of the shaft adapter, and an outer wall of the second shaft may be supported against an inner wall of the spring-loaded adapter ring at the first end of the shaft adapter, and by an inner wall of the second bore.

According to another aspect, a shaft adapter may have a cylindrical housing with a first bore extending in an axial direction from a first opening in a first end of the cylindrical housing to a first depth. The shaft adapter may further have a second bore, the concentric with the first bore, and comprising a second bore diameter less than a diameter of the first bore. The second bore may extend to a second depth, greater than the first depth. The shaft adapter may further have a spring-urged adapter ring with an outer diameter approximately equal to the diameter of the first bore, and an inner diameter approximately equal to the diameter of the second bore. The spring-urged adapter ring may be configured to slide along an inner wall of the first bore between the first end of the cylindrical housing, and a step surface between the first bore and the second bore. The first opening of the cylindrical housing may be configured to optionally receive a first shaft or a second shaft. The first shaft may have a diameter approximately equal to the first bore diameter, and the second shaft may have a diameter approximately equal to the second bore diameter. Upon receiving the first shaft, the spring-urged adapter ring may be urged towards the step surface, and an outer wall of the first shaft may be supported against an inner wall of the first bore. Upon receiving the second shaft, the spring-urged adapter ring may be held at the first end of the shaft adapter, and an outer wall of the second shaft may be supported against an inner wall of the spring-urged adapter ring at the first end of the shaft adapter, and by an inner wall of the second bore.

In yet another aspect, a shaft adapter may have a housing with an opening into a stepped cylinder cavity. The stepped cylinder cavity may have a first diameter extending in an axial direction from the opening to a first depth. The stepped cylinder cavity may step down to a second diameter, concentric with and less than the first diameter. The second diameter may extend in the axial direction from the first depth to a second depth. The shaft adapter may further have a spring-urged adapter ring with a ring outer diameter approximately equal to the first diameter, and a ring inner diameter approximately equal to the second diameter. The spring-urged adapter ring may be coupled to, and configured to slide along an inner wall of the stepped cylinder cavity between the opening and the first depth. The opening may be configured to optionally receive a first shaft or a second shaft. The first shaft may have a diameter approximately equal to the first diameter, and the second shaft may have a diameter approximately equal to the second diameter. Upon receiving the first shaft, the spring-urged adapter ring may be urged towards a step surface, and an outer wall of the first shaft may be supported against an inner wall of the stepped cylinder cavity between the opening and the first step. Upon receiving the second shaft, the spring-urged adapter ring may be held at the opening of the shaft adapter, and an outer wall of the second shaft may be supported against an inner wall of the spring-urged adapter ring at the opening of the shaft adapter, and by an inner wall of the stepped cylinder cavity between the first depth and the second depth.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present disclosures are illustrated by way of example and not limited in the accompanying figures in which like reference numerals indicate similar elements and in which:

FIG. 2 schematically depicts a cross-sectional view of a shaft adapter device, according to one or more aspects described herein.

FIGS. 3A-3B depict cross-sectional views of a shaft adapter device receiving a first shaft, according to one or more aspects described herein.

FIG. 4 depicts a cross-sectional view of a shaft adapter device receiving a second shaft, according to one or more aspects described herein.

FIGS. 9A-9C depict views of a spring-loaded adapter ring, according to one or more aspects described herein.

FIGS. 10A-10B depict views of a coil spring, according to one or more aspects described herein.

Further, it is to be understood that the drawings may represent the scale of different elements of one single embodiment; however, the disclosed embodiments are not limited to that particular scale.

DETAILED DESCRIPTION

Aspects of this disclosure relate to a shaft adapter device configured to be removably-coupled to shafts of differing diameters, for example shafts of struts (adjustable or non-adjustable), strut extensions, or other components of a shoring or stabilizing system.

In the following description of the various embodiments, reference is made to the accompanying drawings, which form a part hereof, and in which is shown by way of illustration various embodiments in which aspects of the disclosure may be practiced. It is to be understood that other embodiments may be utilized, and structural and functional modifications may be made, without departing from the scope and spirit of the present disclosure.

Figure 1A:
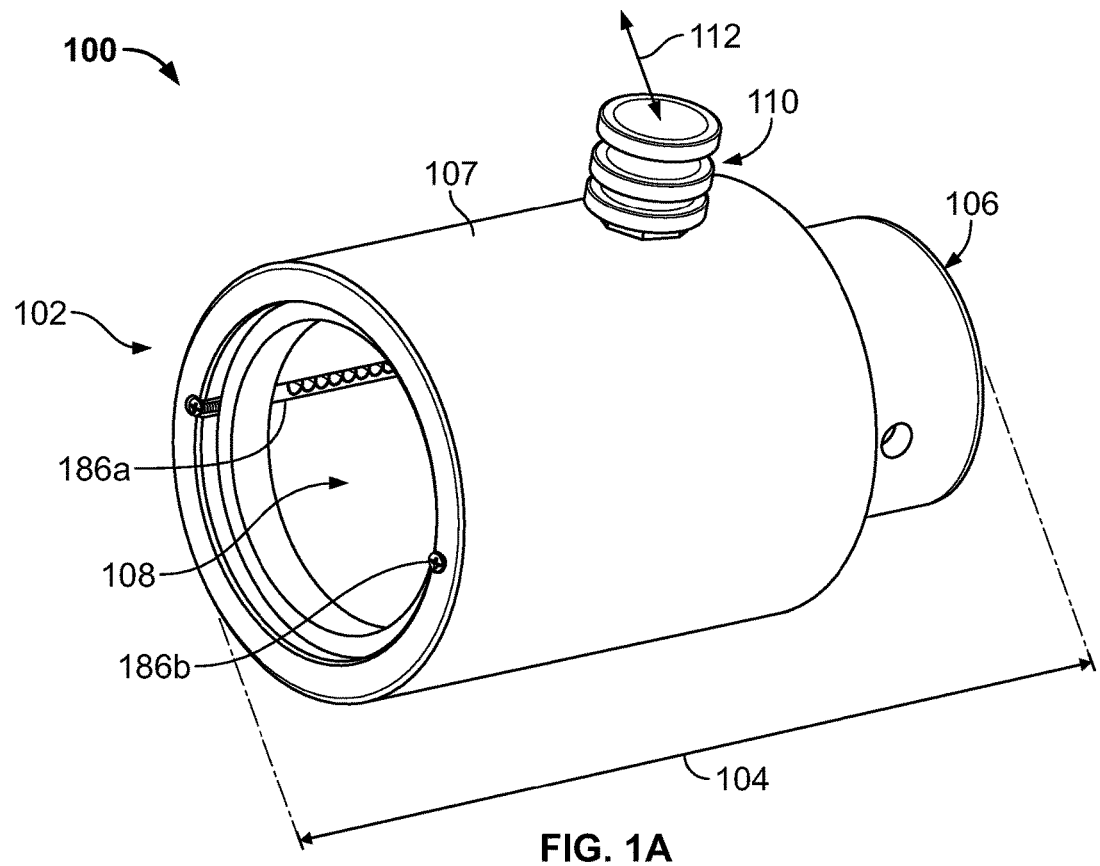
FIGS. 1A-1D depict isometric views of a shaft adapter device, according to one or more aspects described herein.

FIG. 1A depicts an isometric view of a shaft adapter device 100. The shaft adapter device 100, otherwise referred to as shaft adapter 100, may comprise a stepped cylinder structure 107 comprising a first end 102 spaced apart in an axial direction 104 (parallel to an axis of rotation of the stepped cylinder structure of the shaft adapter device 100) from a second end 106. In one implementation, the first end 102 may comprise a first opening 108 configured to receive an end of a shaft (not pictured) comprising an outer diameter selected from a group of one or more diameters compatible with the shaft adapter device 100. Accordingly, the shaft adapter device 100 may be configured to be removably-coupled to a shaft (not pictured) at the first end 102, and may be configured to be removably-coupled to a connection element or device (not pictured) at the second end 106, and such that the connection element or device may include, among others, an anchor point, a shoring base comprising one or more surfaces configured to abut an external surface or structure, a base plate, and/or a ram device (e.g. a hydraulic ram device). In one specific example, the shaft adapter device 100 may be configured to be removably-coupled to a shaft comprising an outer diameter selected from two outer diameters compatible with the shaft adapter device 100. In this way, the shaft adapter device 100 may facilitate removable-coupling between a connection element or device (not pictured) at the second end 106 and a shaft (not pictured) at the first end 102, and without requiring a user to add additional adapter fittings to the shaft (not pictured).

In one implementation, upon receiving an end of a shaft (not pictured) into the first opening 108, the shaft adapter device 100 may be removably-coupled to the shaft by a locking pin 110. In particular, the locking pin 110 may extend in a radial direction 112 through a sidewall of the shaft adapter device 100 to engage, and thereby removably-couple, the end of the inserted shaft. In one example, the locking pin 110 may be manually-actuated. As such, the locking pin 110 may be spring-loaded, such that a spring urges the locking pin 110 towards a center of the shaft adapter device 100. In another example, the locking pin 110 may comprise a threaded structure, and may be configured to be screwed into the sidewall 107 of the shaft adapter device 100. In yet another example, the locking pin 110 may be configured to removably-couple the shaft into the shaft adapter device 100 using an interference fit. Additionally, those of ordinary skill in the art will recognize various additional or alternative locking pin 110 implementations, otherwise referred to as locking mechanism 110, without departing from the scope of the disclosures described herein.

Figure 1B:
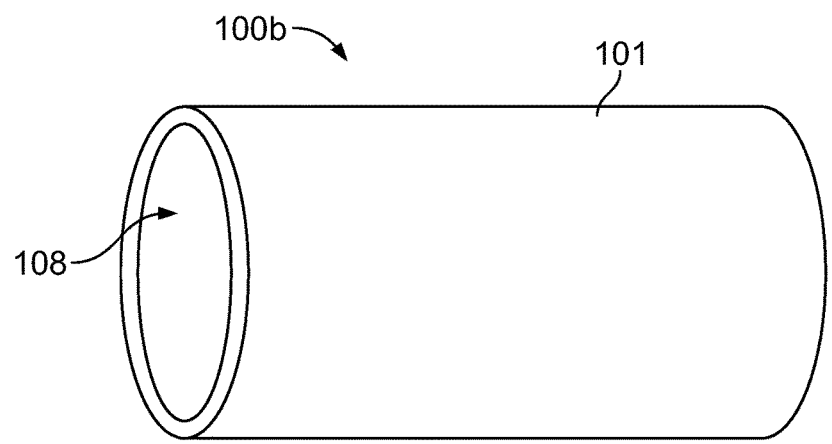
Figure 1C:
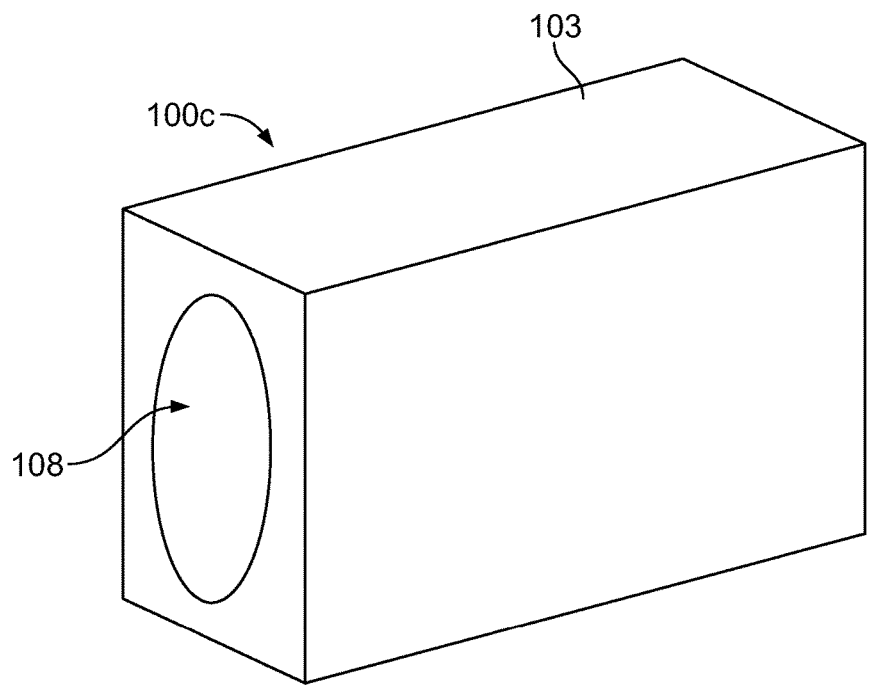
Figure 1D:
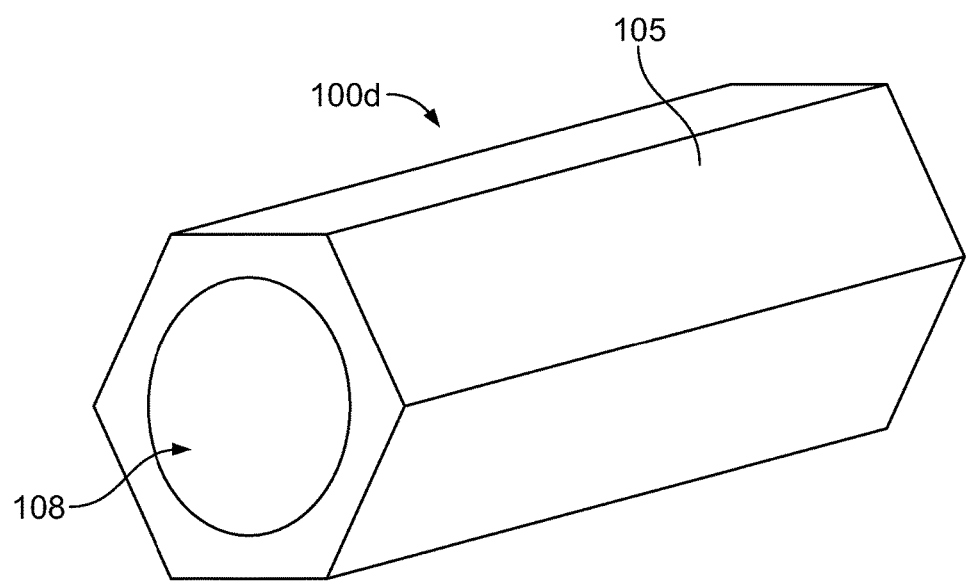

Those of ordinary skill in the art will recognize that the shaft adapter 100 may be embodied with alternative geometries to that stepped cylinder housing structure 107 depicted in FIG. 1A, and without departing from the scope of the disclosures herein. For example, and as depicted in FIG. 1B, a housing of the shaft adapter device 100 may comprise a substantially cylindrical structure, without a stepped geometry. As such, shaft adapter 100b, as depicted in FIG. 1B, may comprise a cylindrical outer geometry 101, while retaining one or more of those shaft adapter elements described in relation to FIG. 1A (as well as those elements described throughout the rest of this disclosure), including, among others, the first opening 108. In another example, and as schematically depicted in FIG. 1C, an outer geometry of a shaft adapter 100 may have a cuboidal geometry 103. As such, the depicted shaft adapter 100c may comprise elements similar to those described in relation to FIG. 1A, including the first opening 108, while having a cuboidal outer geometry 103. In yet another example, and as schematically depicted in FIG. 1D, an outer geometry of a shaft adapter 100 may have a prismoidal geometry, without departing from the scope of the disclosures described herein. In one specific example, an outer surface of the housing 105 of shaft adapter 100d may be embodied with a hexagonal prism geometry, and additionally include elements described in relation to FIG. 1A, as well as throughout this disclosure, such as the first opening 108.

Furthermore, those of ordinary skill in the art will recognize that the described elements of the shaft adapter 100, as well as any other elements described in this disclosure, may be constructed using any material. For example, one or more components of the shaft adapter device 100 may be constructed using a metal, an alloy, a ceramic, a fiber-reinforced material, a thermoplastic, or a wood, or combinations thereof. In certain examples, one or more components are made from 7075 T651 aluminum, and in various embodiments one or more components are made from 6061 T651 aluminum. In some embodiments, one or more components are made from stainless steel, including but not limited to hardened stainless steel, e.g. 17-4 stainless steel. In some examples the aluminum is anodized, and in certain embodiments the anodized material is coated with a fluoropolymer, such as polytetrafluoroethylene. Further, the shaft adapter device 100, as well as other elements described in this disclosure, may be constructed using any manufacturing methodologies known to those of ordinary skill in the art, without departing from the scope of these disclosures.

FIG. 2 schematically depicts a cross-sectional view of the shaft adapter device 100. In particular, FIG. 2 depicts the stepped cylinder structure of the shaft adapter device 100 comprising a first outer diameter 116 extending along a first axial length 122 from the first end 102. The stepped cylinder structure of the shaft adapter device 100 steps down to a second outer diameter 118, less than the first outer diameter 116, and extends along a second axial length 124 to the second end 106.

In one example, the shaft adapter device 100 may be embodied with a first bore 126, centered at the first end 102, and comprising a first bore diameter 130 extending in the axial direction 104 from the first end 102 to a first depth 134. Additionally, the shaft adapter device 100 may be embodied with a second bore 128, concentric with the first bore 126, and comprising a second bore diameter 132, less than the first bore diameter 130, and extending in the axial direction 104 from the first end 102 to a second depth 136, greater than the first depth 134. Exemplary dimensions for one or more of the first outer diameter 116, the second outer diameter 118, the first axial length 122, the second axial length 124, the first bore diameter 130, the second bore diameter 132, the first depth 134, and/or the second depth 136 are discussed in relation to FIG. 8, however those of ordinary skill in the art will recognize that these aforementioned dimensions may be embodied with any numerical values, without departing from the scope of the disclosures described herein.

In one implementation, the shaft adapter device 100 may be embodied with a spring-loaded adapter ring 138. In one example, the spring-loaded adapter ring 138 may be configured to translate along an inner wall 146 of the first bore 126 between the first end 102 and a step surface 148 positioned between the first bore 126 and the second bore 128. In one implementation, the spring-loaded adapter ring 138 may be urged towards the first end 102 of the shaft adapter device 100 by one or more springs 150*a*-150*b*. Further details of the one or more springs 150*a*-150*b* are provided in FIG. 10. Further, the spring-loaded adapter ring 138 may be retained within the first bore 126 by one or more set screws 152*a*-152*b*. However, those of ordinary skill in the art will recognize various additional or alternative structures or elements that may be utilized in addition to, or as an alternative to, the depicted set screws 152*a*-152*b*, without departing from the scope of the disclosures described herein. Further details of the spring-loaded adapter ring 138 are provided in FIG. 9.

FIG. 3A schematically depicts another cross-sectional view of the shaft adapter device 100. In particular, FIG. 3A depicts the shaft adapter device 100 receiving a shaft 114 into the first opening 108. In one example, the shaft 114 may be embodied with a substantially cylindrical geometry. In turn, the shaft 114 may have a first shaft diameter 120. In one implementation, the first shaft diameter 120 may be less than the first bore diameter 130 and greater than the second bore diameter 132. In one example, the first shaft diameter 120 may be approximately equal to the first bore diameter 130. In one implementation, a surface 140 of the shaft 114 may be configured to contact a top surface 142 (see, e.g., FIG. 5) of a spring-loaded adapter ring 138.

In one example, FIG. 3A depicts the shaft adapter device 100 in a first configuration, having the spring-loaded adapter ring 138 in a first position such that a spring force exerted by springs 150*a* and 150*b* retains the spring-loaded adapter ring 138 at the first end 102 of the shaft adapter device 100. In another example, FIG. 3B depicts the shaft adapter device 100 in a second configuration, and having the spring-loaded adapter ring 138 in a second position, abutting the step surface 148. In particular, FIG. 3B schematically depicts the second configuration of the shaft adapter device 100 upon application of an external force 144 to the shaft 114 in the depicted direction. In one implementation, the external force 144 may result in relative motion of the shaft 114 and the shaft adapter device 100. In particular, the external force 144 may urge the spring-loaded adapter ring 138 to translate along the inner wall 146 of the first bore 126, thereby compressing springs 150*a* and 150*b* to a compressed state, as depicted in FIG. 3B. As such, the spring-loaded adapter ring 138 may be described as being in a compressed configuration/position, as depicted in FIG. 3B and FIG. 4.

Accordingly, in one implementation, upon receiving the shaft 114 into the shaft adapter device 100, and as depicted in the second configuration depicted in FIG. 3B, an outer wall of the shaft 114 (at the first shaft diameter 120) may be supported against the inner wall 146 of the first bore 126. Additionally, relative motion of the shaft 114 and the shaft adapter device 100 along the direction of force 144 may be limited by an end surface of shaft 114 contacting a bottom surface 160 of the second bore 128.

FIG. 4 schematically depicts another cross-sectional view of the shaft adapter device 100. In particular, FIG. 4 depicts an end of a shaft 154 fully inserted into a shaft adapter device 100. In one example, the shaft 154 may have a diameter 156 approximately equal to the second bore diameter 132.

Accordingly, upon application of force 158 (e.g. a manual force) to the shaft 154, an end of the shaft 154 may move relative to the shaft adapter device 100, and such that the relative motion of the shaft 154 and the shaft adapter device 100 may be limited by an end surface of the shaft 154 contacting the bottom surface 160 of the second bore 128.

In that configuration depicted in FIG. 4, the spring-loaded adapter ring 138 may remain in the first position, such that the spring force exerted by springs 150*a* and 150*b* retains the spring-loaded adapter ring 138 at the first end 102 of the shaft adapter device 100. In this way, as depicted in the configuration of FIG. 4, an outer wall of the shaft 154 may be supported against an inner wall 162 of the spring-loaded adapter ring 138 and an inner wall 164 of the second bore 128.

In one implementation, one or more of shafts 114 and/or 154 may be configured with a circumferential groove 166/168. As such, in one example, shaft 114 may be embodied with a portion, extending a long length 151, and comprising a diameter approximately equal to the second bore diameter 132. Accordingly, for shaft 114, the circumferential groove 166 may be positioned along this portion extending along length 151. In one example, the locking pin 110 may be configured to be received into this circumferential groove 166/168, and thereby removably-coupling the shaft 114/154 into the shaft adapter device 100.

In one example, the shaft adapter device 100 may be configured with a through-bore 168 comprising a bore diameter 170 less than the second bore diameter 132. In this way, the through-bore 168 may extend from the first end 102 through to the second end 106 of the shaft adapter device 100, and thereby forming a second opening 172 at the second end 106. In one example, the through-bore 168 may be configured to receive a fastener (e.g. fastener 174 depicted FIG. 6) for removably-coupling the shaft adapter device 100 to a compatible device (e.g. hydraulic ram device 176). In one example, the stepped cylinder cavity of shaft adapter device 100, made up of the first bore 126, the second bore 128, and the third bore 168, may comprise an additional stepped bore. This element is further described in relation to FIG. 8D as comprising dimensions 194 and 196.

Figure 5:
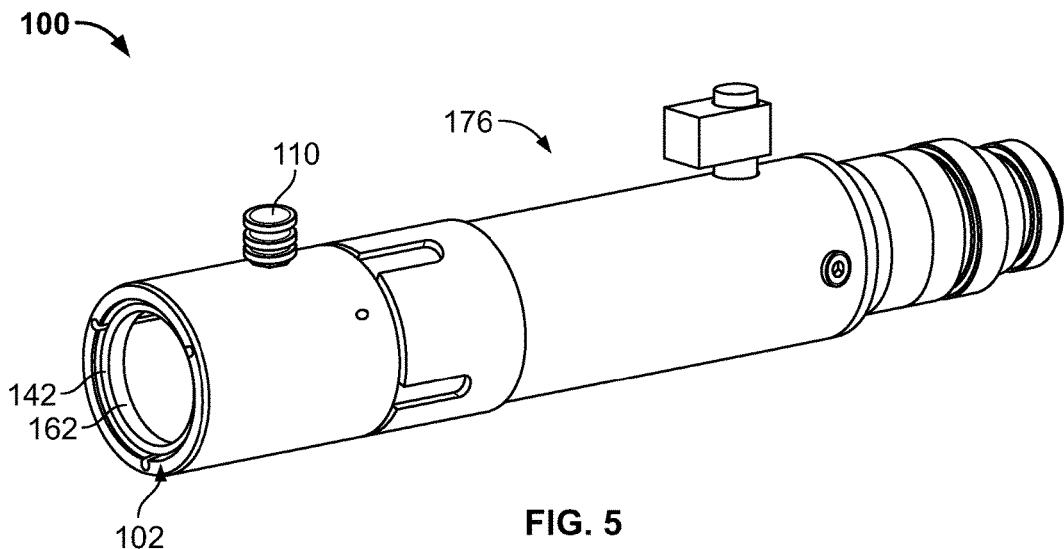
FIG. 5 depicts an isometric view of a shaft adapter device removably coupled to a hydraulic ram device, according to one or more aspects described herein.

FIG. 5 depicts an isometric view of the shaft adapter device 100 removably-coupled to a hydraulic ram device 176. Accordingly, the hydraulic ram device 176 may represent one of a plurality of different external devices that may be configured to be removably-coupled to the shaft adapter device 100. For example, the shaft adapter device 100 may be configured to be removably-coupled to, among others, an anchor point, a shoring base comprising one or more surfaces configured to abut an external surface or structure, another strut comprising a shaft (e.g. a strut extension), and/or a base plate. In this way, those of ordinary skill in the art will recognize that the second axial length 124 may be configured to be received into a socket (e.g. socket 178 of device 176 depicted in FIG. 6), and such that this socket may represent a generalized connection configured to removably couple to the second end 106 of the shaft adapter device 100. In this way, those of ordinary skill in the art will recognize that the shaft adapter device 100 may be utilized to removably-couple shafts of differing diameters to one or more external devices, and beyond those embodiments of external devices (e.g. hydraulic ram device 176 and/or base plate 180) included in this disclosure.

Figure 6:
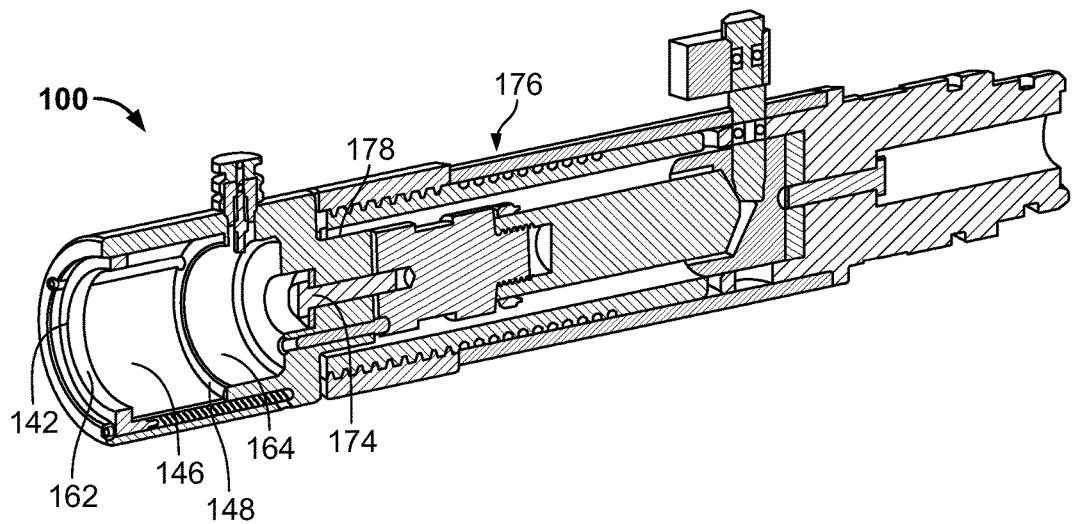
FIG. 6 depicts a cross-sectional view of a shaft adapter device removably coupled to a hydraulic ram device, according to one or more aspects described herein.

FIG. 6 schematically depicts a cross-sectional view of the shaft adapter device 100 removably-coupled to the hydraulic ram device 176. In particular, FIG. 6 depicts a socket 178 into which the second axial length 124 of the shaft adapter device 100 may be received and removably-coupled. In one example, the second axial length 124 may be removably-coupled into the socket 178 using fastener 174, wherein fastener 174 may be a bolt, among others. Those of ordinary skill in the art will recognize that the hydraulic ram device 176 may be embodied with various hydraulic ram technologies and operational characteristics, without departing from the spirit of the disclosures described herein.

Figure 7:
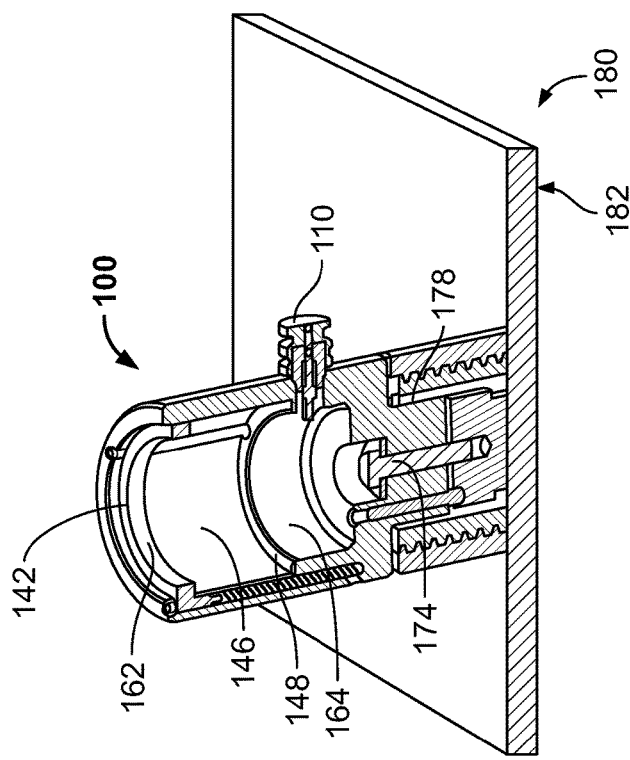
FIG. 7 depicts a cross-sectional view of a shaft adapter device removably coupled to a base plate, according to one or more aspects described herein.

FIG. 7 schematically depicts a cross-sectional view of the shaft adapter device 100 removably-coupled to a base plate 180. In particular, the base plate 180 may represent a structure configured to brace a shaft (e.g. shaft 114 or 154) against an external surface (not pictured). As such, the base plate 118 may comprise a surface 182 configured to abut an external surface (not pictured). Additionally, the base plate 118 may include a socket 178 configured to receive the second axial length 124 of the shaft adapter device 100, similar to the socket 178 of hydraulic ram device 176.

Those of ordinary skill in the art will recognize additional or alternative fastening methodologies that may be utilized to removably-couple the shaft adapter device 100, and in particular, the second axial length 124, into a corresponding cavity (e.g. socket 178). For example, an external surface of the second axial length 124 of the shaft adapter device 100 may be embodied with one or more threads configured to be received into a corresponding threaded cavity (e.g. socket 178). For example, FIG. 8A depicts a threaded outer surface 180 of the second axial length 124 of the shaft adapter device 100.

Figure 8A:
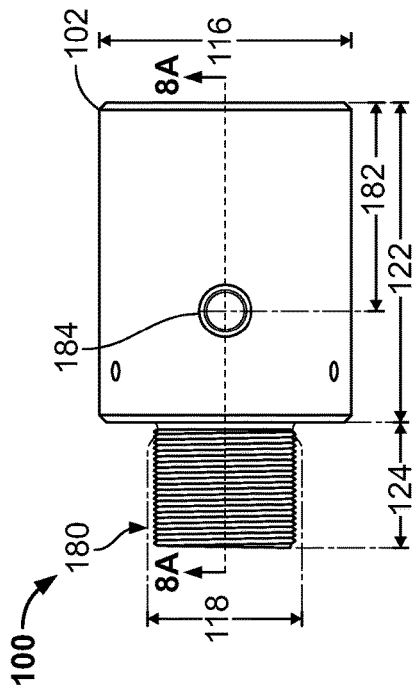
FIGS. 8A-8D depict additional views of a shaft adapter, according to one or more aspects described herein.

FIG. 8A depicts another implementation of the shaft adapter 100. Accordingly, while those of ordinary skill in the art will recognize that the absolute and/or relative dimensions of the various features of the shaft adapter device 100 may be embodied with any numerical values, without departing from the scope of the disclosures herein, one example of specific dimensions of the shaft adapter device 100 is presented herein. As such, in one example, the first axial length 122 may be embodied with a length of 4.8 inches. The second axial length 124 may be embodied with a length of 1.875 inches. The second outer diameter 118 may be embodied with a diameter of 1.995 inches. Element 184 may be a through hole/bore extending through a sidewall of the first axial length 122 of the stepped cylinder structure of the shaft adapter 100. In one example, through-hole 184 may extend into the second bore 128. Accordingly, through-hole 184 may be configured to receive the locking pin 110. In one example, distance 182 extending from the first end 102 to the center of the through-hole 184 may measure 3.125 inches. In one example, the first outer diameter 116 may be embodied with a diameter of 3.73 inches.

Figure 8B:
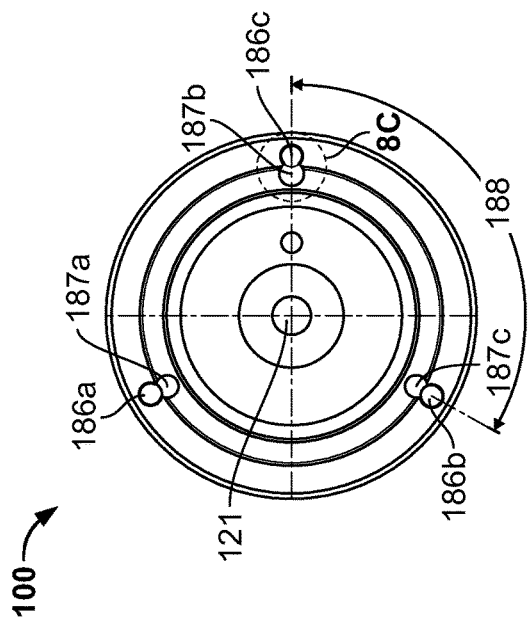

Turning to FIG. 8B, in one example, the shaft adapter 100 may comprise one or more bores 186 extending from the first end 102 in the axial direction 104, and extending down through a wall of the shaft adapter 100 between the first outer diameter 116 and the first bore 126. In one example, the bores 186 may have a center point positioned at a diameter of 3.26 inches from a center 121 of the shaft adapter device 100. In one example, the bores 186 may have a diameter of 0.25 inches. In one example, the shaft adapter 100 may be embodied with three bores 186a-186c. Accordingly, an angle 188 between each of the bores 186a-186c may measure approximately 120°. In another example, the shaft adapter 100 may be embodied with two bores 186a-186b (e.g. FIG. 1). In this example, an angle 188 between each of the bores 186a-186b may measure approximately 180°. In yet another example, the shaft adapter 100 may have a single bore 186 (not pictured).

Figure 8C:
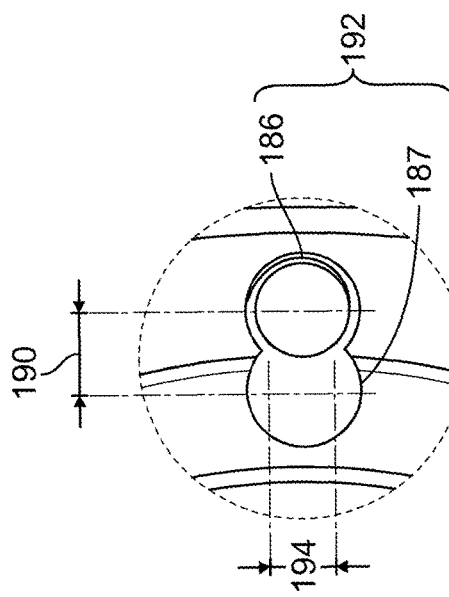

In one implementation, the shaft adapter 100 may comprise one or more bores 187a-187c extending from the first end 102 in the axial direction 104, where the bores 187a-187c may extend into the step structure 148. In one example, the one or more bores 187a-187c may be centered on a same radius as the one or more bores 186a-186c. Accordingly, in one example, the centers of the one or more bores 186 and the one or more bores 187 may be offset by distance 190, wherein distance 190 may be equal to 0.18 inches. In one example, the one or more bores 187 may have a diameter of approximately 0.25 inches. In one implementation, a bore 186 and a bore 187 may intersect to form an overlapping double bore structure 192, as depicted in FIG. 8C (showing a set screw in bore 186). In one example, an overlap between a bore 186 and a bore 187 may result in a gap 194. Accordingly, in one example, gap 194 may measure 0.14 inches. In one implementation, gap 194 may form a channel extending into the first bore 126 through the inner wall 146. In one implementation, the overlapping double bore structures 192 may be spaced apart around a perimeter of the first bore 126, forming multiple channels in the inner wall 146. In that depicted implementation of FIG. 8B, three overlapping double bore structures may be formed by bores 186a-

186c and 187a-187c. In turn, these three overlapping double bore structures may form three channels in the inner wall 146. Those of ordinary skill in the art will recognize, however, that shaft adapter 100 may be embodied with any number of channels, without departing from the scope of these disclosures.

In one implementation, bore 186 may be configured to receive and retain a coil spring (e.g. coil spring 150). Accordingly, in one example, bore 186 may be sized such that a coil spring 150 may be retained within the bore 186 and may not fit through the gap 194.

Figure 8D:
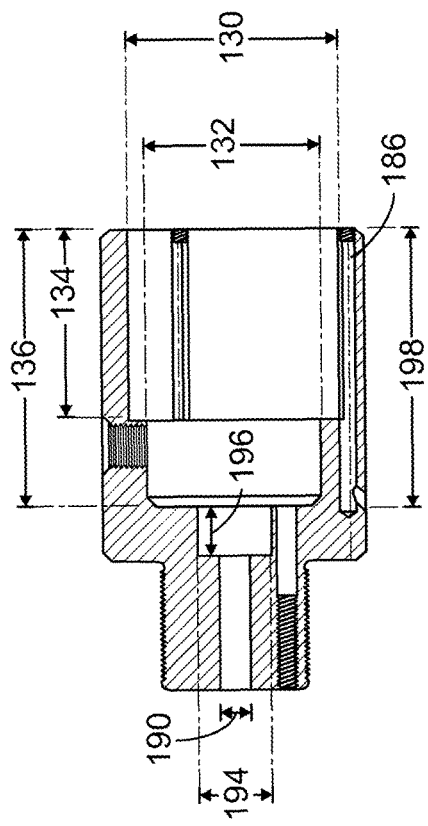

FIG. 8D depicts a cross-sectional view of the shaft adapter 100. Accordingly, in one example, the first depth 134 may measure 2.75 inches. In another example, the second depth 136 may measure 4.0 inches. In one example, the first bore diameter 130 may measure 3.0 inches and the second bore diameter 132 may measure 2.5 inches. In this way, the shaft adapter 100 may be configured to optionally receive a shaft 114 comprising a first shaft diameter 120 of approximately 3.0 inches or optionally a shaft 154 comprising a shaft diameter 156 of approximately 2.5 inches. In one example, the through-bore 168 may have a bore diameter 170 of 0.4 inches, configured to receive a fastener, e.g. fastener 174. In another example, the shaft adapter 100 may comprise an additional bore comprising a diameter 194 and a depth 196. In one example, the diameter 194 may measure approximately 1.0 inches and the depth 196 may measure approximately 0.7 inches. In one example, the bore comprising diameter 194 and depth 196 may be configured to receive a head of a fastener, e.g. a bolt head of fastener 174. In another example, bore 186 may be embodied with a depth 198. In one example, depth 198 may measure approximately 4.0 inches.

Figure 9A:
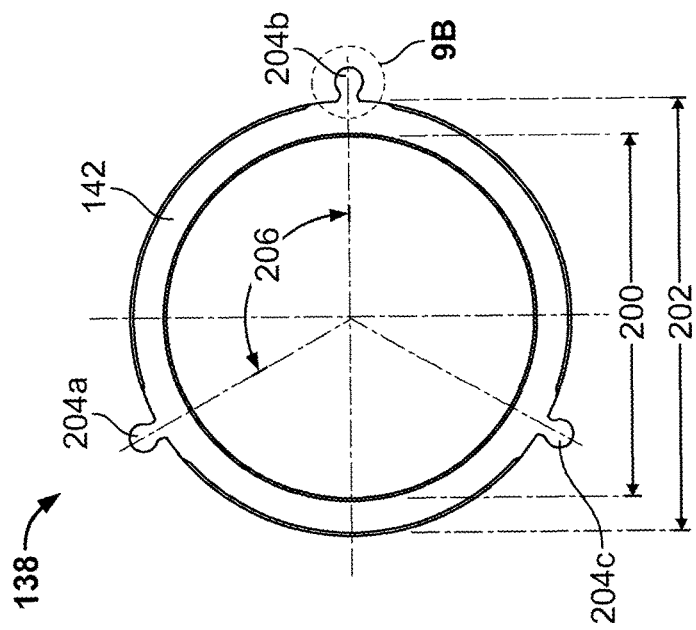

FIG. 9A depicts the spring-loaded adapter ring 138. In one example, the spring-loaded adapter ring 138 may have an inner diameter 200 and outer diameter of 202. In one specific implementation, the inner diameter 200 may measure approximately 2.5 inches and the outer diameter 202 may measure approximately 2.99 inches. In one example, the spring-loaded adapter ring 138 may be embodied with one or more tab structures 204. In the depicted embodiment of FIG. 9A, the spring-loaded after ring 138 is embodied with three tab structures 204a-204c. Accordingly, each of the tab structures 204a-204c may be configured to be received into those channels formed in the inner wall 146 of the first bore 126 by bores 186a-c and 187a-c, as depicted in FIG. 8B.

In certain examples, each of the tab structures are configured to be received into the channels and substantially all of the diameter of bores 186a-c. In one example, the three tab structures 204a-204c may be equally spaced apart around the outer diameter 202, separated by angle 206. As such, angle 206 may measure approximately 120°. In another example, the spring-loaded adapter ring 138 may be embodied with two tab structures (e.g. FIG. 1). Accordingly, when embodied with two tab structures, angle 206 may measure approximately 180°. Additionally or alternatively, the spring-loaded adapter ring 138 may be embodied with a single tab structure 204, or a number of tab structures 204 above those three depicted tab structures 204a-204c depicted in FIG. 9A, without departing from the scope of the disclosures described herein.

FIG. 9B depicts a more detailed view of a tab structure 204. In particular, the tab structure 204 may have a neck 208. In one example, the neck 208 may measure approximately 0.14 inches, and maybe configured to extend through gap 194, described in relation to FIG. 8C. In one example, the tab structure 204 may have a diameter 210. Accordingly, in one example, diameter 210 may measure approximately 0.2 inches, and be configured to be received into a bore 186.

FIG. 9C depicts a side view of the spring-loaded adapter ring 138. In particular, the adapter ring 138 may have a thickness 214. In one example, thickness 214 may be equal to approximately 0.375 inches. In one implementation, each of the tab structures 204a-204c may have a depth 212 equal to approximately 0.75 inches. Further, the geometry of tab structures 204a-204c may include a substantially cylindrical end comprising a diameter 216 approximately equal to 0.14 inches, and configured to fit into an end of a coil spring, such as end 218 of coil spring 150, as depicted in FIG. 10A.

FIGS. 10A and 10B depict respective elevation an end views of a coil spring 150. In particular, coil spring 150 may have a length 220 of approximately 4.13 inches. Additionally, coil spring 150 may have a diameter 222 of approximately 0.195 inches. Further, those of ordinary skill in the art will recognize that coil spring 150 may be embodied with any spring properties (e.g. any spring constant, and the like), without departing from the scope of the disclosures described herein.

What is claimed is:

1. A shaft adapter, comprising:
   a stepped cylinder structure comprising a first outer diameter extending along a first axial length from a first end, and stepping down to a second outer diameter, less than the first outer diameter, extending along a second axial length to a second end;
   a first bore, centered at the first end, and comprising a first bore diameter extending in an axial direction from the first end to a first depth;
   a second bore, concentric with the first bore, and comprising a second bore diameter, less than the first bore diameter, extending in the axial direction from the first end to a second depth, greater than the first depth; and
   a spring-loaded adapter ring comprising a ring outer diameter approximately equal to the first bore diameter, and a ring inner diameter approximately equal to the second bore diameter, the spring-loaded adapter ring configured to translate along an inner wall of the first bore from the first end to a step surface between the first bore and the second bore,
   wherein the second axial length is configured to be received into a socket comprising a diameter approximately equal to the second outer diameter,
   wherein the first end of the adapter is configured to optionally receive a first shaft comprising a first shaft diameter approximately equal to the first bore diameter, or a second shaft comprising a second shaft diameter approximately equal to the second bore diameter,
   wherein upon receiving the first shaft, the spring-loaded adapter ring is urged towards the step surface such that an outer wall of the first shaft is supported against the inner wall of the first bore, and
   wherein upon receiving the second shaft, the spring-loaded adapter ring is held at the first end by a spring force, and an outer wall of the second shaft is supported against an inner wall of the spring-loaded adapter ring at the first end, and an inner wall of the second bore.

2. The shaft adapter of claim 1, further comprising:
   a locking pin, configured to optionally removably-couple the first shaft or the second shaft to the adapter.

3. The shaft adapter of claim 1, further comprising:
   an overlapping double bore extending from the first end in the axial direction, and extending down through a wall of the adapter between the first outer diameter and the first bore, wherein the overlapping double bore partially overlaps with the first bore to form a channel extending along the inner wall of the first bore.

4. The shaft adapter of claim 3, wherein the overlapping double bore extends to a third depth, greater than the first depth from the first end of the stepped cylinder structure.

5. The shaft adapter of claim 4, wherein the overlapping double bore is configured to retain a coil spring, and the coil spring is configured to urge the spring-loaded adapter ring from the step surface to the first end.

6. The shaft adapter of claim 5, further comprising:
a set screw, received into the overlapping double bore at the first end, and configured to retain the spring-loaded adapter ring within the stepped cylinder structure.

7. The shaft adapter of claim 4, wherein the spring-loaded adapter ring further comprises a tab structure configured to be received into the channel.

8. The shaft adapter of claim 3, further comprising a fourth bore, concentric with, and comprising a diameter less than, the first and second bores, and extending in the axial direction from the first end through to the second end of the shaft adapter.

9. The shaft adapter of claim 8, wherein the fourth bore is configured to receive a fastener for removably-coupling the shaft adapter to the socket.

10. The shaft adapter of claim 1, wherein the second depth is less than the first axial length from the first end of the shaft adapter.

11. A shaft adapter, comprising:
a cylindrical housing comprising a first end spaced apart in an axial direction from a second end;
a first bore comprising a first bore diameter extending in the axial direction from a first opening in the first end of the cylindrical housing to a first depth;
a second bore, concentric with the first bore, comprising a second bore diameter less than the first bore diameter, extending in the axial direction from the first end to a second depth, greater than the first depth; and
a spring-urged adapter ring comprising a ring outer diameter approximately equal to the first bore diameter, and a ring inner diameter approximately equal to the second bore diameter, the spring-urged adapter ring slidably-coupled to an inner wall of the first bore, and configured to be movable between the first end of the cylindrical housing and a step surface between the first bore and the second bore,
wherein the first opening is configured to optionally receive a first shaft comprising a first shaft diameter approximately equal to the first bore diameter, or a second shaft comprising a second shaft diameter approximately equal to the second bore diameter,
wherein upon receiving the first shaft, the spring-urged adapter ring is urged towards the step surface such that an outer wall of the first shaft is supported against the inner wall of the first bore, and
wherein upon receiving the second shaft, the spring-loaded adapter ring is held at the first end by a spring force, and an outer wall of the second shaft is supported against an inner wall of the spring-urged adapter ring at the first end, and an inner wall of the second bore.

12. The shaft adapter of claim 11, wherein the second end of the cylindrical housing is configured to be coupled to an external support surface.

13. The shaft adapter of claim 11, wherein the cylindrical housing further comprises:
a locking pin, configured to optionally removably-couple the first shaft or the second shaft to the cylindrical housing.

14. The shaft adapter of claim 13, wherein the locking pin extends in a radial direction through a sidewall of the cylindrical housing into the second bore between the first depth and the second depth.

15. The shaft adapter of claim 13, wherein the cylindrical housing further comprises three channels, spaced apart around a perimeter of the first bore, and extending along the inner wall of the first bore in the axial direction, and wherein the spring-urged adapter ring further comprises three tab structures configured to be slidably-coupled to the three channels.

16. The shaft adapter of claim 15, wherein each of the three channels retains a coil spring configured to exert a spring force to urge the spring-urged adapter ring from the step surface towards the first end of the cylindrical housing.

17. A shaft adapter, comprising:
a housing comprising an opening into a stepped cylinder cavity, the stepped cylinder cavity comprising a first diameter extending in an axial direction from the opening to a first depth, and stepping down to a second diameter, concentric with and less than the first diameter, the second diameter of extending in the axial direction from the first depth to a second depth; and
a spring-urged adapter ring comprising a ring outer diameter approximately equal to the first diameter, and a ring inner diameter approximately equal to the second diameter, the spring-urged adapter ring slidably-coupled to an inner wall of the stepped cylinder cavity between the opening and the first depth,
wherein the opening is configured to optionally receive a first shaft comprising a first shaft diameter approximately equal to the first diameter, or a second shaft comprising a second shaft diameter approximately equal to the second diameter,
wherein upon receiving the first shaft, the spring-urged adapter ring is urged towards a step surface at the first depth such that an outer wall of the first shaft is supported against the inner wall of the stepped cylinder cavity between the opening and the first depth, and
wherein upon receiving the second shaft, the spring-loaded adapter ring is held at the opening by a spring force, and an outer wall of the second shaft is supported against an inner wall of the spring-urged adapter ring at the opening, and an inner wall of the of the stepped cylinder cavity between the first depth and the second depth.

18. The shaft adapter of claim 17, wherein the housing further comprises:
a locking mechanism, configured to removably-couple the first shaft or the second shaft to the housing.

19. The shaft adapter of claim 17, wherein the stepped cylinder cavity further comprises:
a bore extending from the opening in the axial direction, and extending down through a wall of the housing between an outer surface of the housing and first diameter of the stepped cylinder cavity, wherein the bore partially overlaps with the first diameter of the stepped cylinder cavity to form a channel extending along the inner wall between the opening and the first depth.

20. The shaft adapter of claim 19, wherein the spring-urged adapter ring further comprises a tab structure configured to be slidably-coupled into the channel.

* * * * *